United States Patent
Shiau et al.

(10) Patent No.: US 7,267,472 B2
(45) Date of Patent: Sep. 11, 2007

(54) LIGHT SOURCE PROTECTIVE STRUCTURE OF A BACKLIGHT MODULE

(75) Inventors: Deng-Kuen Shiau, Tao Yuan Shien (TW); Shr-Bin Lin, Tao Yuan Shien (TW); Wei-Chih Chiu, Tao Yuan Shien (TW); Chia-Hong Chen, Tao Yuan Shien (TW); Chia-Yun Hsu, Tao Yuan Shien (TW); Yu-Chen Hsu, Tao Yuan Shien (TW)

(73) Assignee: A U Optronics Corporation, Hsin-chu (TW)

( * ) Notice: Subject to any disclaimer, the term of this patent is extended or adjusted under 35 U.S.C. 154(b) by 0 days.

(21) Appl. No.: 11/250,529

(22) Filed: Oct. 17, 2005

(65) Prior Publication Data

US 2006/0092670 A1    May 4, 2006

(30) Foreign Application Priority Data

Oct. 29, 2004   (TW) ............................... 93133005 A

(51) Int. Cl.
 *F21V 33/00* (2006.01)
(52) U.S. Cl. .................. 362/633; 362/614; 362/609
(58) Field of Classification Search .............. 362/614, 362/611, 609, 608, 607, 600, 634, 633, 632
See application file for complete search history.

(56) References Cited

U.S. PATENT DOCUMENTS

| 6,219,117 | B1 * | 4/2001 | Nagakubo et al. ............. 349/65 |
| 6,962,430 | B2 * | 11/2005 | Ito et al. ...................... 362/634 |
| 7,118,266 | B2 * | 10/2006 | Matsushita ................... 362/609 |
| 2003/0189821 | A1 * | 10/2003 | Moon ............................ 362/31 |
| 2006/0239027 | A1 * | 10/2006 | Chen ............................ 362/600 |

FOREIGN PATENT DOCUMENTS

JP    10-172324    6/1998

* cited by examiner

*Primary Examiner*—Laura K. Tso
(74) *Attorney, Agent, or Firm*—Bacon & Thomas, PLLC

(57) ABSTRACT

An impact-resistant structure for a light source of a flat panel display device is disclosed. The impact-resistant structure for protecting a light source mainly includes a reflector having an accommodating space and at least a protrusion located at the two ends of the reflector. The two protrusions can effectively absorb or buffer off the impact caused from the movement of a light guide plate without blocking light from the light source. A similar protective structure of a light cover having stoppers and an accommodating space for locating reflector is also disclosed.

16 Claims, 9 Drawing Sheets

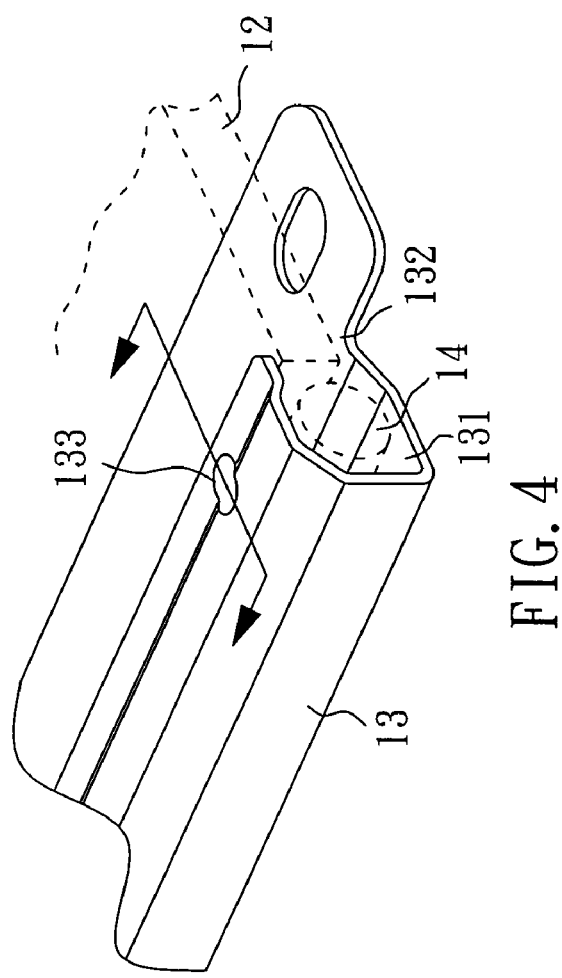
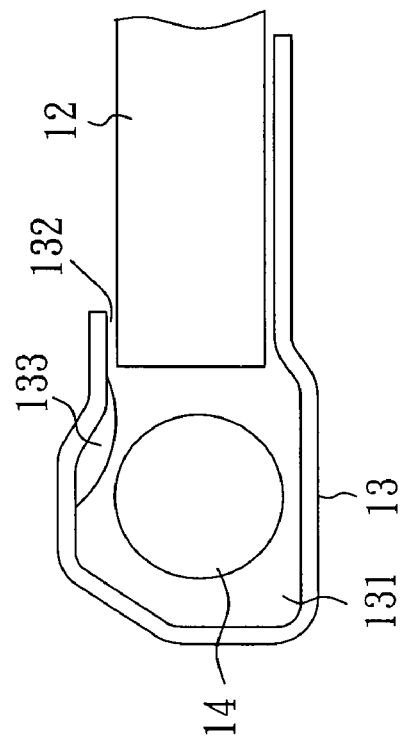
FIG. 4
FIG. 5

LIGHT SOURCE PROTECTIVE STRUCTURE OF A BACKLIGHT MODULE

BACKGROUND OF THE INVENTION

1. Field of the Invention

The present invention relates to a backlight module and more particularly, to a light source protective structure of a backlight module for flat panel display to protect the light source and resist impact from a light guide plate.

2. Description of Related Art

A Liquid Crystal display (LCD) is a sort of display panel, which can't be provided with spontaneous glowing, and must be applied with an additional light source to achieve the designed display function. Therefore, the backlight module comprising a light source is one of the key component on LCD.

Further, a delicate electronic apparatus must pass a standard test before being made available in the market, assuring the approval quality of the products in order to protect consumers. The manufacturers of backlight modules execute strict quality control and service system to insure the quality of their products. Most manufacturers are trying to apply for high standards in order to obtain the acceptance of customers from the competitive market, for example, to execute reliability tests on their products.

To take reference with FIG. 1 of an exploded view, and FIG. 2 of sectional view, of a backlight module in prior art. Wherein the backlight module 9 comprises a bottom shell 91, a light guide plate 92, a lens 93, and a diffuser 94, those apparatuses above are arranged in order. The backlight module 9 further comprises a reflector 95 and a lamp cover 96 arranged at lateral side 911 of bottom shell 91. Reflector 95 further comprises a light source 97, which is a lamp.

During the reliability test of said backlight module 9, the backlight module 9 is arranged to suffer an impact in the direction of a predetermined angle, for example, Y-direction, and at the same time the backlight module 9 is also examined for checking the broken status in a predetermined spot. In the meantime, light guide plate 92 of backlight module 9 will exhibit a sliding motion, therefore, light guide plate 92 may strike light source 97. As a result damage to the light source 97 is caused and further the luminance of backlight module 9 is affected.

In order to avoid the light source 97 being hit by light guide plate 92, the two ends of reflector 95 are bended downward to form a bending strip 951. The strips extend and locate at the non-luminous electrode portions 971 and these two protrusions can buffer off the impact caused from the movement of lighting guide 92 without shielding the light source 97.

However, reflector 95 is usually made of a thin metal sheet member, such that the two bending strips 951 are insufficient to stop the light guide plate 92 from displacement during the impact. The formation of the two bending strips 951 will cause a concentration of stress, thereby affecting the strength of the reflector 95. Further, the light of the light source 97 will be diffused through the cut area of the reflector 95, thereby resulting in an optical abnormality.

Further, bending the reflector 95 for forming the two bending strips 951 produces rough edges, and the procedure is also complicated in practice.

As an alternative to the aforesaid method, there is also known a method of taping the light guide plate to prevent displacement of the light guide plate relative to the light source. However, the adhesive tape is insufficient to handle the so-called reliability tests.

According to another known method, the two ends of the reflector are properly cut into two cavities. The bottom shell can be used for stopping the displacement of light guide plate. According to this method, the shape of the light guide plate must be specially designed. Further, it also tends to cause an optical abnormality.

Therefore, it is desirable to provide an improved method to mitigate or obviate the aforementioned problems.

SUMMARY OF THE INVENTION

A light source protective structure of a backlight module of the present invention includes: a reflector, and said reflector further comprises an accommodating space, an opening, and at least one protrusion; wherein said light source is accommodated inside the accommodating space and radiated to an opening, said light guide plate is adjacent to said opening, said at least one protrusion is adjacent to said opening and protrudes toward said accommodating space to prohibit displacement of said light guide plate toward said light source upon shock of said backlight module.

The light source mentioned above is preferred to be a lamp having non-luminous electrode portions at two distal ends thereof; said at least one protrusion of said reflector is disposed corresponding to said non-luminous electrode portions of said light source. The at least one protrusion of said reflector can be formed through any conventional method. Preferably, the at least one protrusion of said reflector is formed of a part of said reflector by stamping and has either an oval, round or square shape. The reflector of said reflector can be formed in any form. Preferably, the reflector is formed of a reflective sheet member. More preferably, the reflective sheet member is an aluminum sheet. In addition, the backlight module can further comprise a lens and a diffuser arranged in a stack over the light guide plate, and the backlight module is also provided with glasses in order.

Another light source protective structure of a backlight module of the present invention comprises a lamp cover, and a reflector. The backlight module here comprises a light source and a light guide plate. The lamp cover is placed around said light source and has at least one lug formed on said lamp cover. The reflector is mounted in said lamp cover and has an accommodating space and an opening.

On the other hand, the light source is accommodated inside said accommodating space and radiated to said opening, said light guide plate is adjacent to said opening, said lug protruding between said light source and said light guide plate, and adapted to prohibit displacement of said light guide plate toward said light source upon shock of said backlight module.

Preferably, the reflector is also provided with at least one through hole and the at least one lug of said lamp cover is inserted through said through hole of said reflector into said accommodating space between said light source and said light guide plate. Moreover, the reflector can selectively further comprise an extension board overlapped on said lamp cover; said through hole of said reflector is formed in said extension board. In addition, the lamp cover preferably has a semicircular, triangular, square, trapezoidal or any other shape. The lug of said lamp cover has a cross section of any conventional shape. Preferably, the at least one lug of said lamp cover has an angled cross section in either L-shaped, oblique semicircular, triangular or any other shape. The reflector mentioned above can be formed of any form. Preferably, the reflector mentioned above is formed of a reflective sheet member. More preferably, reflective sheet member is an aluminum sheet.

Furthermore, the backlight module is preferred to be a module further comprising a lens and a diffuser arranged in a stack over said light guide plate and the backlight module is also provided with glasses in order.

Other objects, advantages, and novel features of the invention will become more apparent from the following detailed description when taken in conjunction with the accompanying drawings.

BRIEF DESCRIPTION OF THE DRAWINGS

FIG. 4 is an enlarged view of a part of FIG. 3.

FIG. 5 is a sectional assembly view of a part of the light source protective structure according to the first embodiment of the present invention.

DETAILED DESCRIPTION OF THE PREFERRED EMBODIMENT

Figure 1:
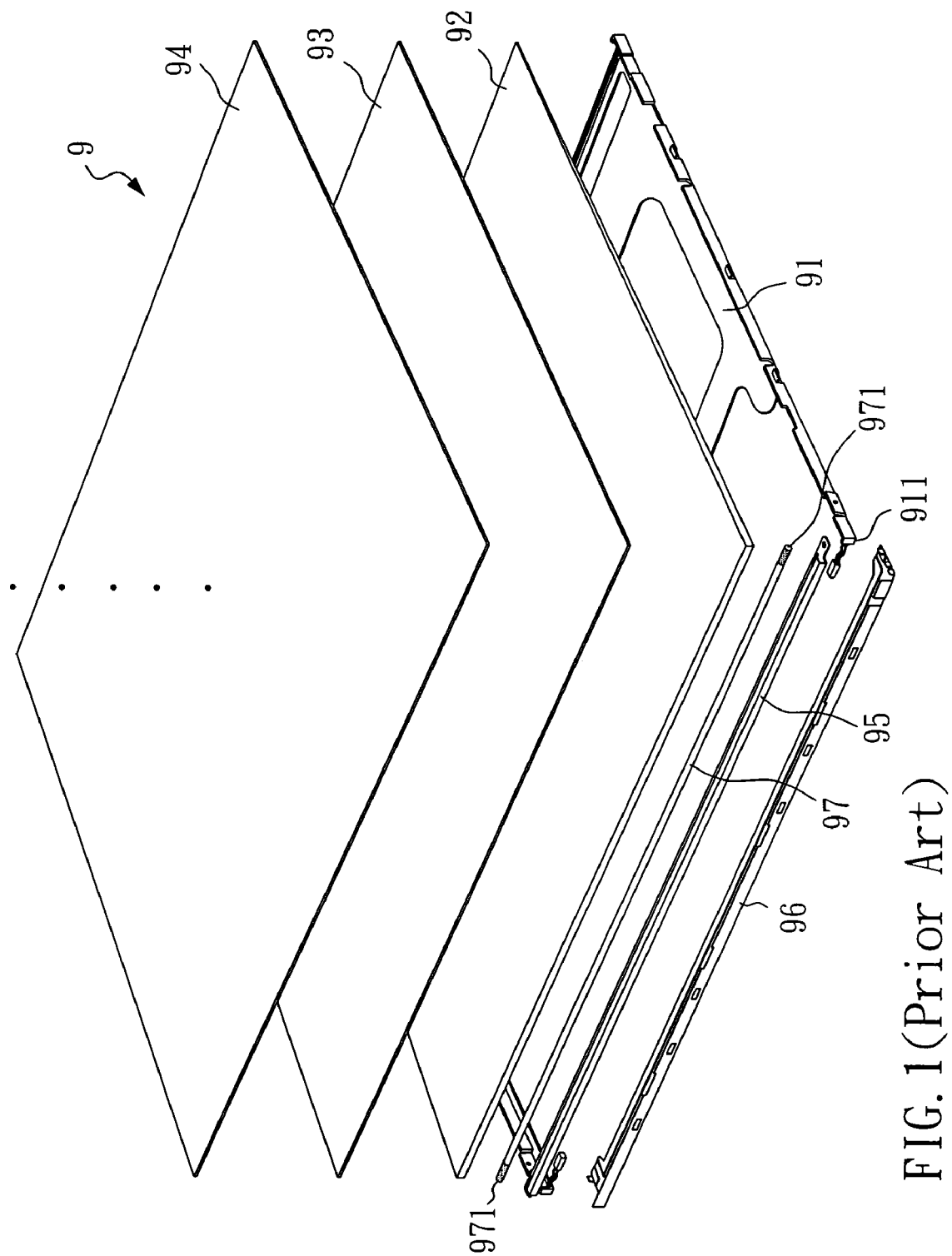
FIG. 1 is an exploded view of a backlight module according to the prior art.
Figure 2:
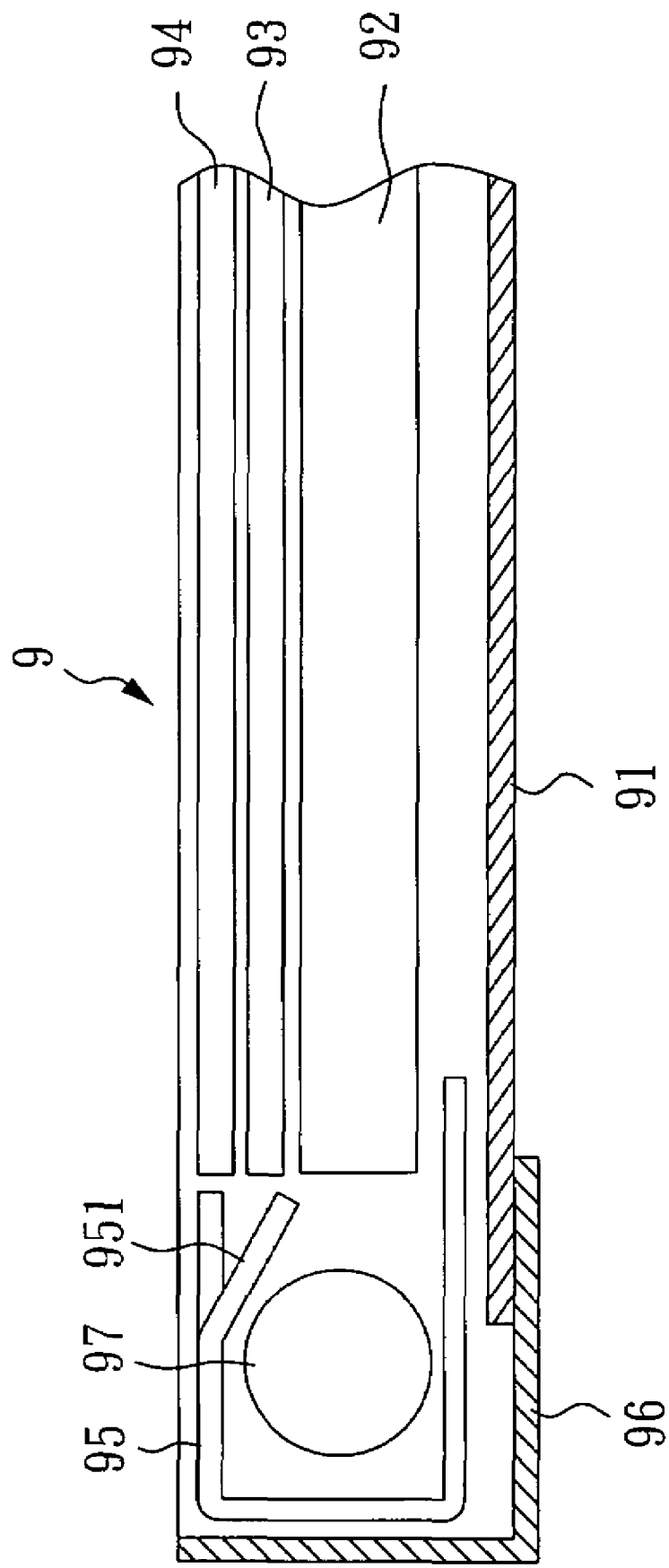
FIG. 2 is a sectional view of the light source protective structure of the backlight module according to the prior art.
Figure 3:
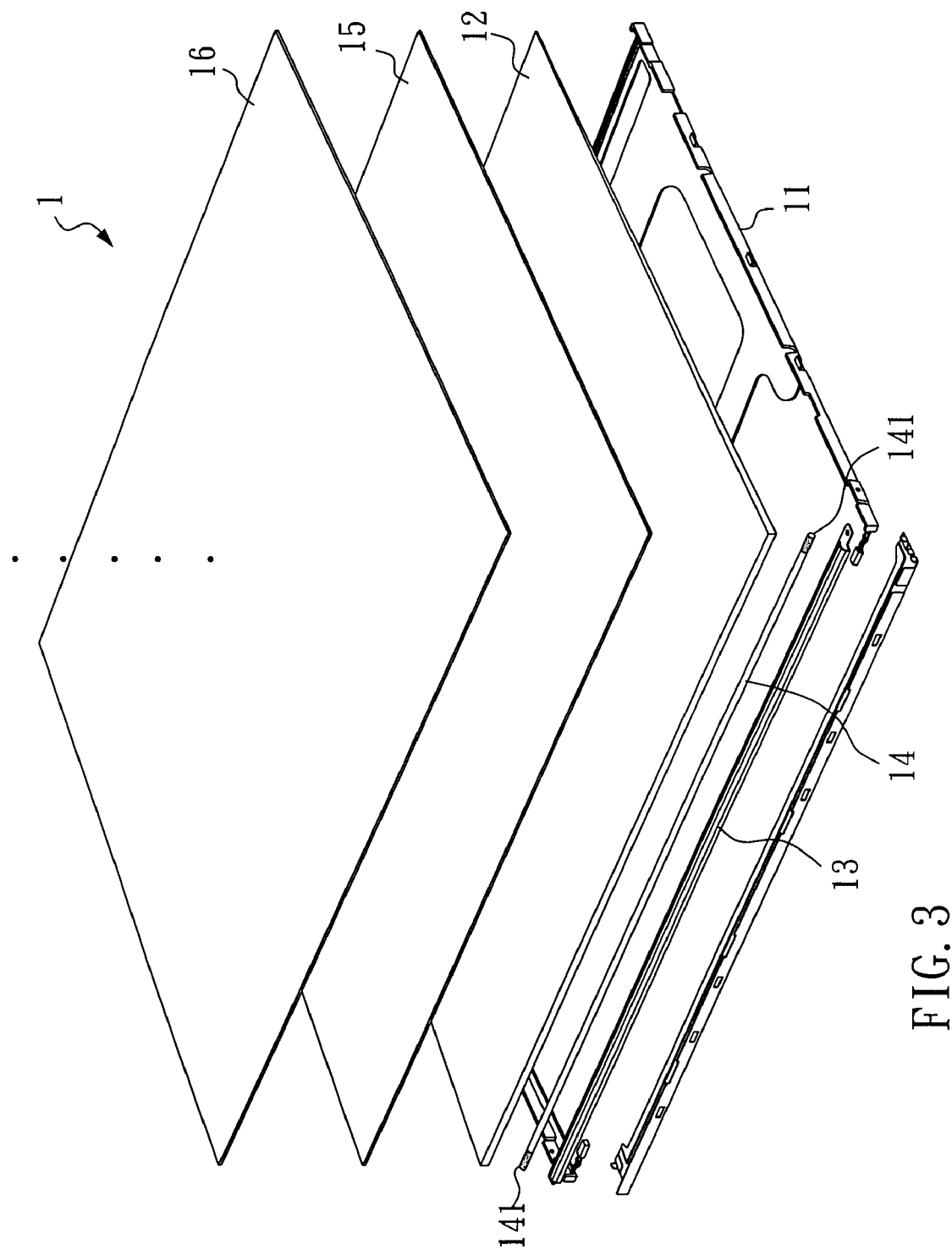
FIG. 3 is an exploded view of a backlight module with a light source protective structure according to a first embodiment of the present invention.

Referring to FIGS. 3~5, a backlight module 1 is shown comprising a bottom shell 11, a light guide plate 12, a reflector 13, a light source 14, a lens 15, and a diffuser 16. The light guide plate 12, the lens 15 and the diffuser 16 are arranged in a stack over the top of the bottom shell 11. The reflector 13 is located at one lateral side of the bottom shell 11. The backlight module 1 is further mounted with glasses and other devices (not shown).

The reflector 13 surrounds an accommodating space 131 and an opening 132. The opening 132 faces downward to the bottom shell 11. According to this embodiment, the reflector 13 is formed by bending an aluminum reflecting sheet member. The light source 14 is mounted in the accommodating space 131, having non-luminous electrode portions 141 at two distal ends thereof for connection to power source. According to this embodiment, the light source 14 is a lamp.

Further, the light guide plate 12 is set adjacent to the opening 132 of the reflector 13 and the light source 14 in the accommodating space 131. The reflector 13 further has two protrusions 133 respectively disposed at two ends of a longitudinal axis thereof. According to this embodiment, the protrusions 133 are respectively formed of a part of the body of the reflector 13 by stamping, having an oval shape. These two protrusions 133 are disposed adjacent to the opening 132 corresponding to the non-luminous electrode portions 141 at the two ends of the light source 14 and respectively projecting into the accommodating space 131 of the reflector 13.

As stated above, the two protrusions 133 are respectively projecting into the accommodating space 131 corresponding to the non-luminous electrode portions 141 at the two ends of the light source 14, therefore, the protrusions 133 do not block the light of the light source 14, i.e., the radiation function of the light source 14 works well, maintaining the luminance of the backlight module 1. Further, during the so-called reliability test, i.e., impact test of the backlight module 1, the two protrusions 133 of the reflector 13 effectively prohibit displacement of the light guide plate 12, preventing impact of the light guide plate 12 against the light source 14.

Figure 7:
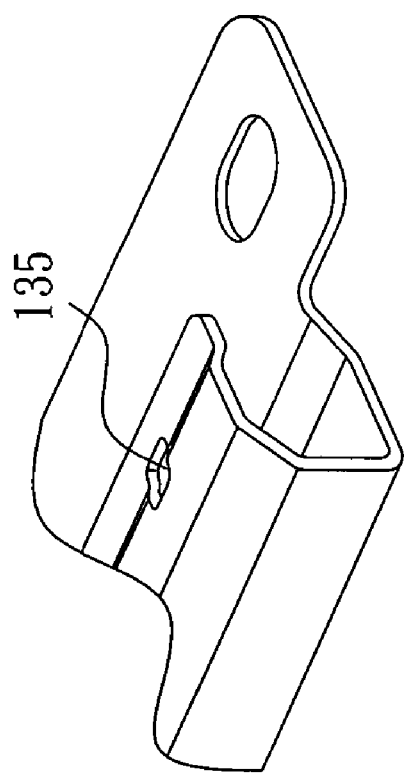
FIG. 7 is an enlarged view of a part of the second embodiment of the present invention.
Figure 6:
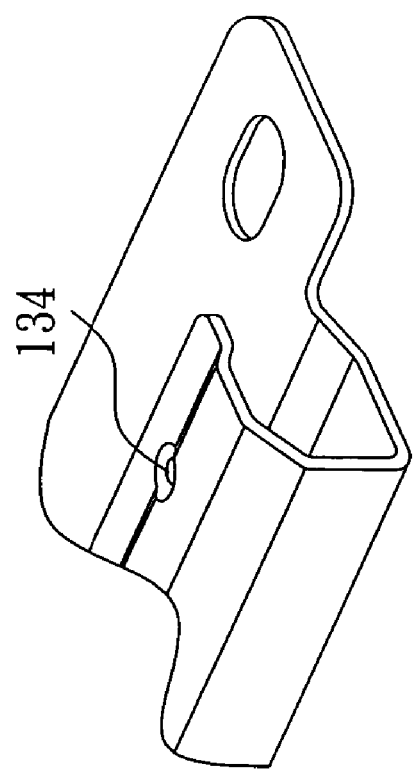
FIG. 6 is an enlarged view of a part of the second embodiment of the present invention.

FIG. 6 is an enlarged view of a part of the second embodiment of the present invention. According to this embodiment, each protrusion 134 has a circular shape. FIG. 7 is an enlarged view of a part of the second embodiment of present invention. According to this embodiment, each protrusion 135 has a rectangular shape. As indicated, the protrusions of the reflector can be made having any of a variety of shapes.

Figure 8:
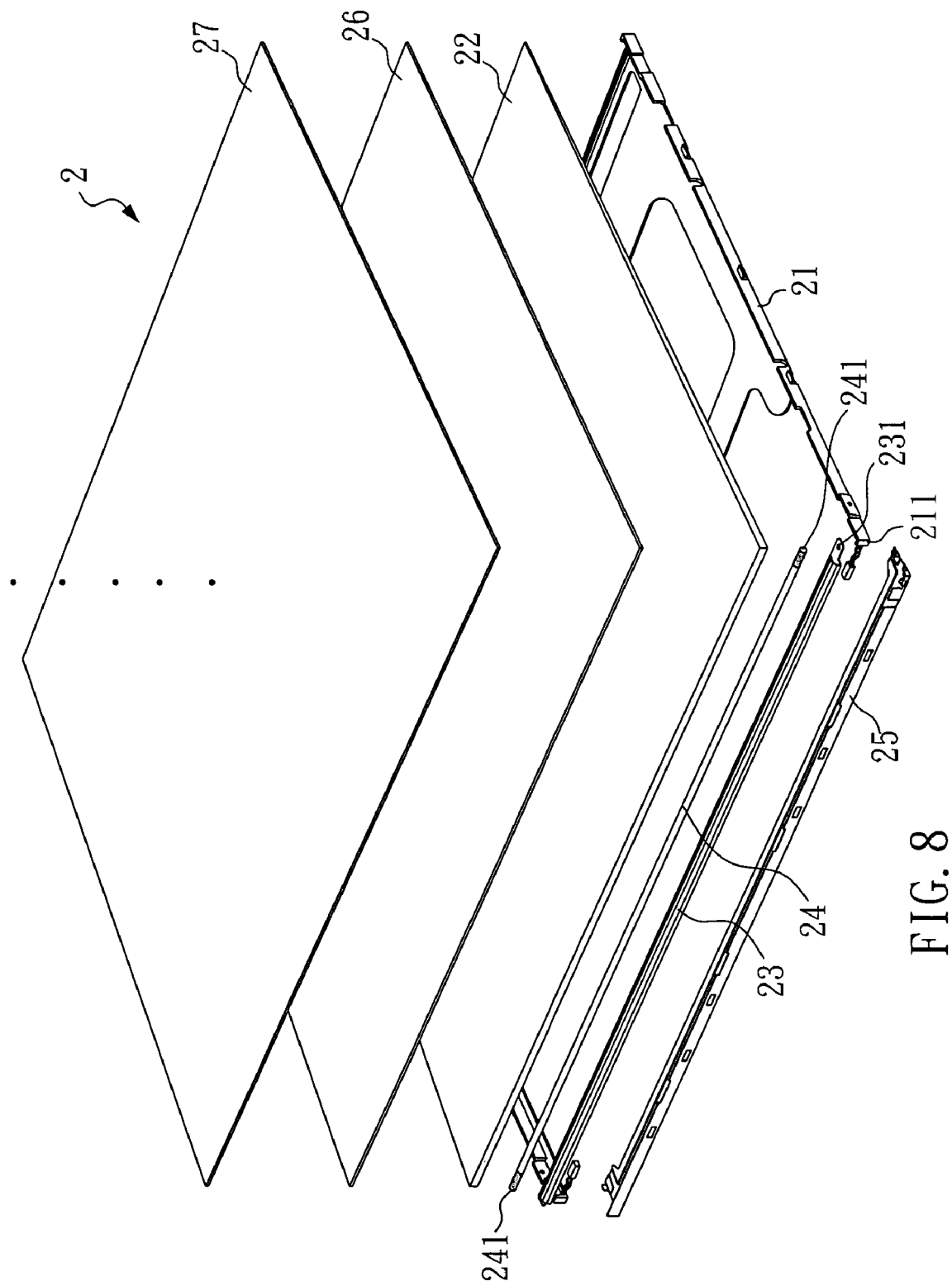
FIG. 8 is an exploded view of a light source protective structure according to a third embodiment of the present invention.
Figure 10:
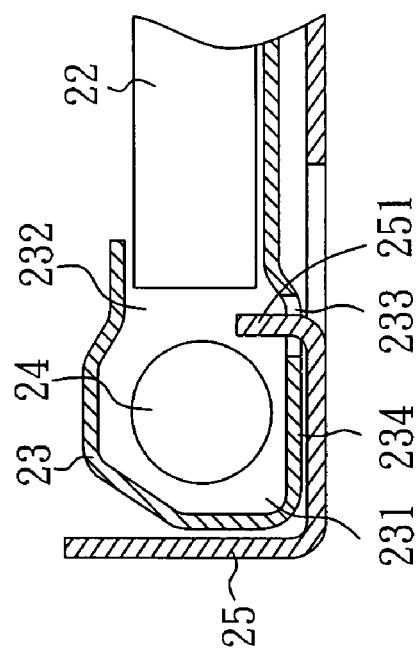
FIG. 10 is a sectional assembly view of a part of the light source protective structure according to the third embodiment of the present invention.
Figure 9:
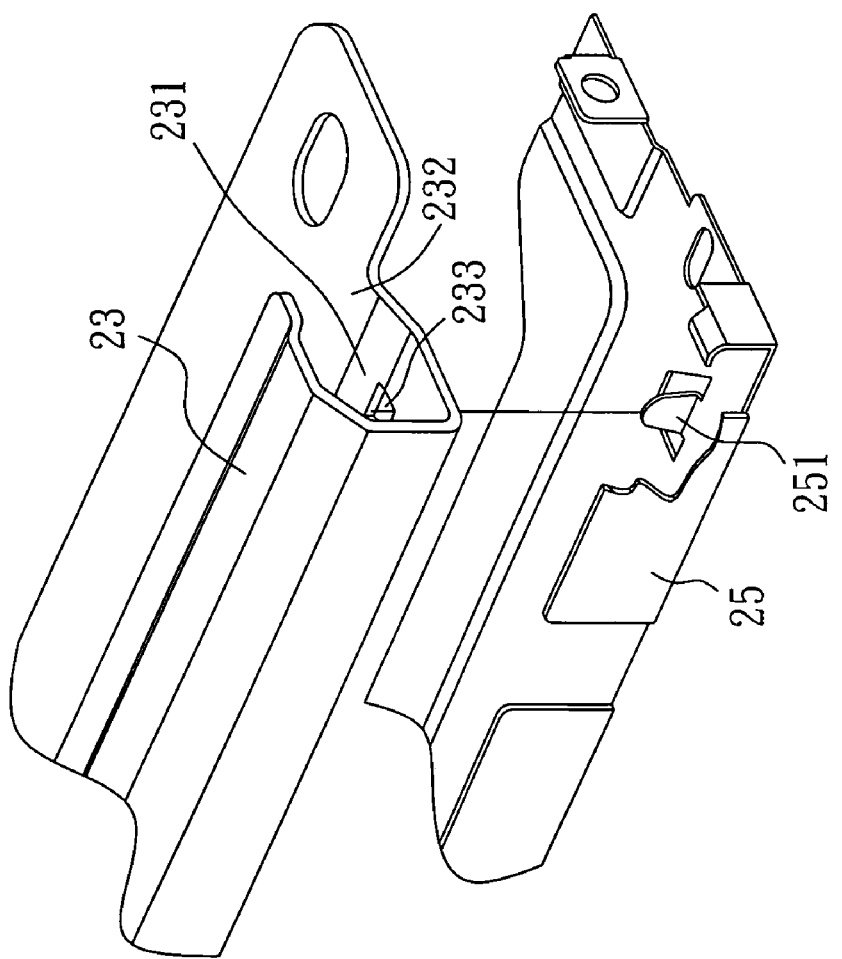
FIG. 9 is an enlarged view of a part of FIG. 8.

FIGS. 8~10 show a backlight module 2 constructed according to the fourth embodiment of the present invention. According to this embodiment, the backlight module 2 comprises a bottom shell 21, a light guide plate 22, a reflector 23, a light source 24, lamp cover 25, a lens 26, and a diffuser 27. The light guide plate 22, the lens 26 and the diffuser 27 are arranged in a stack over the top side of the bottom shell 21. The lamp cover 25 is provided at one lateral side 211 of the bottom shell 21. The backlight module 2 is further mounted with a glass and other devices (not shown).

Further, the reflector 23 is mounted on the lamp cover 25, defining an accommodating space 231 and an opening 232. The opening 232 faces the bottom shell 21. According to this embodiment, bending an aluminum reflecting sheet member into shape makes the reflector 23. The reflector 23 has an extension board 234 overlapped on the lamp cover 25. The extension board 234 has two through holes 233 bilaterally disposed adjacent to the opening 232.

Further, the light source 24 is mounted in the accommodating space 231, having non-luminous electrode portions 241 at the two distal ends thereof for connection to power source. According to this embodiment, the light source 24 is a lamp. The light guide plate 22 is set adjacent to the opening 232 of the reflector 23 and the light source 24 in the accommodating space 231.

It should be noted that the lamp cover 25 has two upward lugs 251 respectively inserted through the through holes 233 of the extension board 234 and protruding in between the opening 232 of the reflector 23 and the light guide plate 22 corresponding to the non-luminous electrode portions 241 at the two ends of the light source 24. According to this embodiment, the cross section of lugs 251 are L-shaped angled lugs and provided with semicircular shape.

As indicated above, the two upward lugs 251 of the lamp cover 25 are respectively inserted through the through holes 233 of the extension board 234 and protruding in between the opening 232 of the reflector 23 and the light guide plate 22 corresponding to the non-luminous electrode portions 241 at the two ends of the light source 24, so that they do not block the light of the light source 24, i.e., the luminance of the backlight module 2 is well maintained. Further, during the so-called reliability test, i.e., impact test of the backlight module 2, the two upward lugs 251 of the lamp cover 25 effectively prohibit displacement of the light guide plate 22, preventing impact of the light guide plate 22 against the light source 24.

Figure 11:
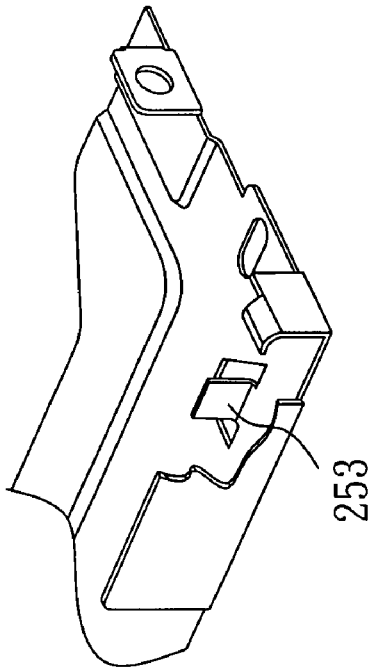
FIG. 11 is an enlarged view of a part of a light source protective structure according to a fifth embodiment of the present invention.
Figure 12:
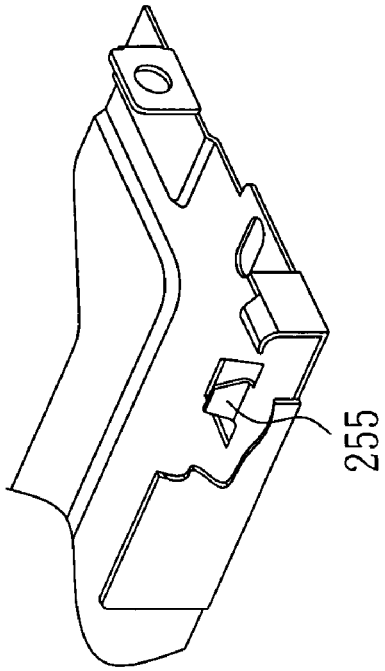
FIG. 12 is an enlarged view of a part of a sixth embodiment of the present invention.
Figure 13:
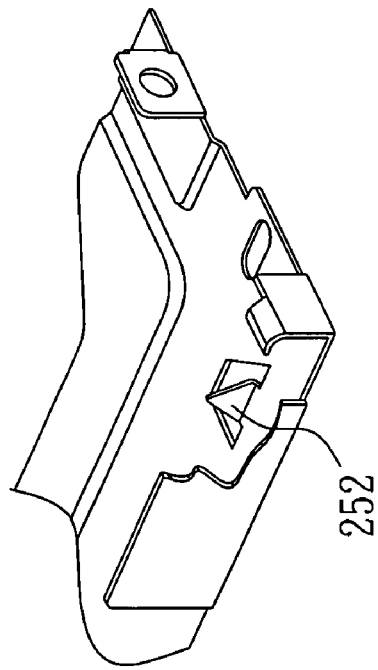
FIG. 13 is an enlarged view of a part of a seventh embodiment of the present invention.
Figure 14:
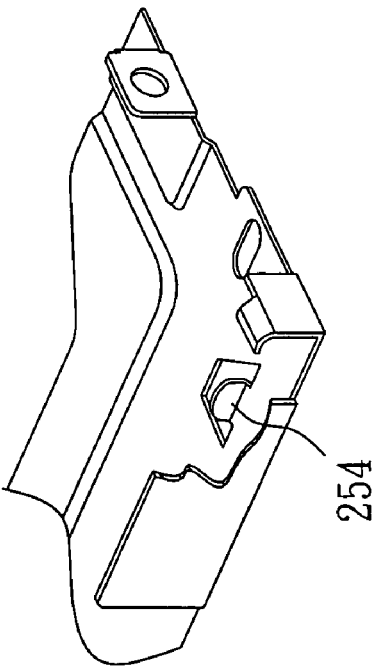
FIG. 14 is an enlarged view of a part of an eighth embodiment of the present invention.

FIG. 11 is an enlarged view of a part of the fifth embodiment of the present invention. According to this embodiment, each lug 252 has a triangular shape. FIG. 12 is an enlarged view of a part of the sixth embodiment of the present invention. According to this embodiment, each lug 253 has a rectangular shape. FIG. 13 is an enlarged view of a part of the seventh embodiment of the present invention. According to this embodiment, each lug 254 has a semi-oval shape. FIG. 14 is an enlarged view of a part of the eighth embodiment of the present invention. According to this embodiment, each lug 255 has a stepped shape. As indicated, the protrusions of the reflector can be made having any of a variety of shapes.

Figure 15:
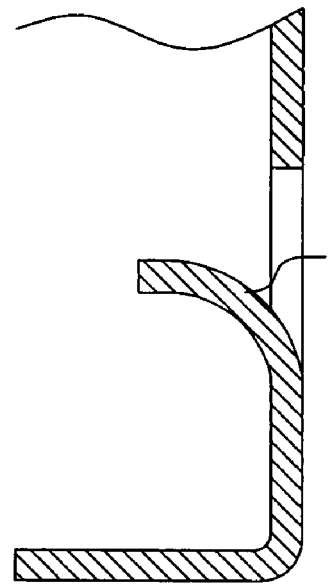
FIG. 15 is an enlarged view in section of a part of a ninth embodiment of the present invention.
Figure 16:
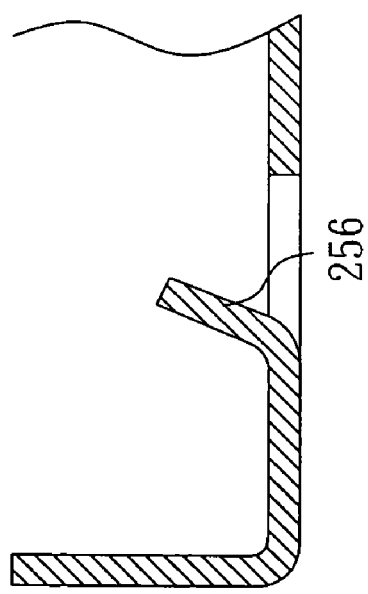
FIG. 16 is an enlarged view in section of a part of a tenth embodiment of the present invention.
Figure 17:
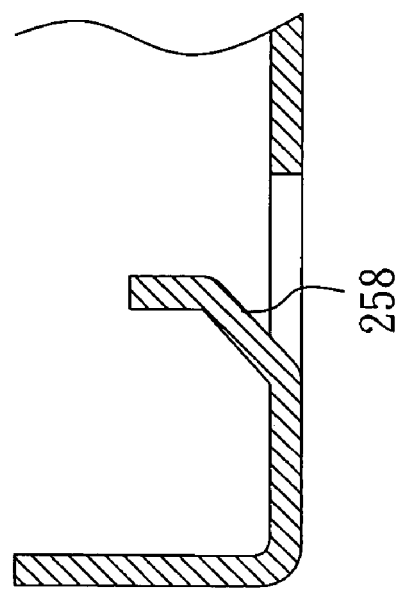
FIG. 17 is an enlarged view in section of a part of the eleventh embodiment of the present invention.

FIG. 15 is an enlarged view in section of a part of a ninth embodiment of the present invention. According to this embodiment, the vertical cross section of each lug 256 extends obliquely upwards. FIG. 16 is an enlarged view in section of a part of a tenth embodiment of the present invention. According to this embodiment, the vertical cross section of each lug 257 curves smoothly upwards, showing a semicircular configuration. FIG. 17 is an enlarged view in section of a part of the eleventh embodiment of the present invention. According to this embodiment, the cross section of each lug 258 extends obliquely upwards and then vertically upwards, showing a triangular configuration.

Although the present invention has been explained in relation to its preferred embodiment, it is to be understood that many other possible modifications and variations can be made without departing from the spirit and scope of the invention as hereinafter claimed.

What is claimed is:

1. A light source protective structure of a backlight module, said backlight module comprising a light source and a light guide plate, said light source protective structure comprising:
    a reflector having an accommodating space, an opening, and at least one protrusion;
    wherein said light source is accommodated inside said accommodating space and radiates light toward said opening, said light guide plate is adjacent to said opening, said at least one protrusion is adjacent to said opening and protruded toward said accommodating space to prohibit displacement of said light guide plate toward said light source; and
    wherein said light source is a lamp having non-luminous electrode portions at two distal ends thereof, and said at least one protrusions of said reflector is disposed corresponding to said non-luminous electrode portions of said light source.

2. The light source protective structure as claimed in claim 1, wherein said protrusion of said reflector is formed of a part of said reflector by stamping.

3. The light source protective structure as claimed in claim 1, wherein said at least one protrusion of said reflector has an oval shape.

4. The light source protective structure as claimed in claim 1, wherein said reflector is formed of a reflective sheet member.

5. The light source protective structure as claimed in claim 4, wherein said reflective sheet member is an aluminum sheet.

6. The light source protective structure as claimed in claim 1, wherein said backlight module further comprises a lens and a diffuser arranged in a stack over said light guide plate.

7. A light source protective structure of a backlight module, said backlight module comprising a light source and a light guide plate, said light source protective structure comprising:
    a lamp cover having at least one lug thereon, wherein said lamp cover is placed round said light source; and a reflector mounted in said lamp cover and having an accommodating space and an opening;
    wherein said light source is accommodated inside said accommodating space and radiates light toward said opening, said light guide plate is adjacent to said opening, said at least one lug protrudes between said light source and said light guide plate to prohibit displacement of said light guide plate toward said light source; and
    wherein said light source is a lamp having non-luminous electrode portions at two distal ends thereof and said at least one lug is disposed corresponding to said non-luminous electrode portions of said lamp.

8. The light source protective structure as claimed in claim 7, wherein said reflector comprises at least one through hole and said at least one lug of said lamp cover is inserted through said at least one through hole of said reflector into said accommodating space between said light source and said light guide plate.

9. The light source protective structure as claimed in claim 8, wherein said reflector further comprises an extension board overlapped on said lamp cover and said at least one through hole of said reflector is formed in said extension board.

10. The light source protective structure as claimed in claim 7, wherein said at least one lug of said lamp cover has a semicircular shape.

11. The light source protective structure as claimed in claim 7, wherein said at least one lug of said lamp cover has an L-shaped.

12. The light source protective structure as claimed in claim 7, wherein said reflector is formed of a reflective sheet member.

13. The light source protective structure as claimed in claim 12, wherein said reflective sheet member is an aluminum sheet.

14. The light source protective structure as claimed in claim 7, wherein said backlight module further comprises a lens and a diffuser arranged in a stack over said light guide plate.

15. A light source protective structure of a backlight module, said backlight module comprising a light source and a light guide plate, said light source protective structure comprising: a lamp cover having at least one lug thereon, wherein said lamp cover is placed round said light source; and a reflector mounted in said lamp cover and having an accommodating space and an opening; wherein said light source is accommodated inside said accommodating space and radiates light toward said opening, said light guide plate is adjacent to said opening, said at least one lug protrudes between said light source and said light guide plate to prohibit displacement of said light guide plate toward said light source, wherein said reflector comprises at least one through hole and said at least one lug of said lamp cover is inserted through said at least one through hole of said reflector into said accommodating space between said light source and said light guide plate.

16. The light source protective structure as claimed in claim 15, wherein said reflector comprises at least one through hole and said at least one lug of said lamp cover is inserted through said at least one through hole of said reflector into said accommodating space between said light source and said light guide plate.

* * * * *